(12) United States Patent
McCall

(10) Patent No.: US 9,611,031 B2
(45) Date of Patent: Apr. 4, 2017

(54) FLUTTER CONTROL ACTUATOR

(71) Applicant: ROSEMOUNT AEROSPACE INC., Burnsville, MN (US)

(72) Inventor: Hiram McCall, Woodland Hills, CA (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 215 days.

(21) Appl. No.: 14/224,183

(22) Filed: Mar. 25, 2014

(65) Prior Publication Data

US 2015/0066251 A1 Mar. 5, 2015

Related U.S. Application Data

(60) Provisional application No. 61/872,229, filed on Aug. 30, 2013.

(51) Int. Cl.
*B64C 13/16* (2006.01)
*B64D 45/00* (2006.01)

(52) U.S. Cl.
CPC ...... *B64C 13/16* (2013.01); *B64D 2045/0085* (2013.01)

(58) Field of Classification Search
CPC .................. B64C 13/16; B64D 2045/0085
USPC ............................................................ 701/3
See application file for complete search history.

(56) References Cited

U.S. PATENT DOCUMENTS

| 4,173,322 A | 11/1979 | MacDonald | |
| 6,193,464 B1* | 2/2001 | Nyhus | B60T 1/065 |
| | | | 416/169 R |
| 2008/0061192 A1* | 3/2008 | Sullivan | B64C 21/10 |
| | | | 244/200 |
| 2010/0084506 A1* | 4/2010 | Meinberg Macedo | B64C 9/04 |
| | | | 244/87 |
| 2013/0026287 A1 | 1/2013 | Goupil | |
| 2013/0338859 A1* | 12/2013 | Yamasaki | G05D 1/0055 |
| | | | 701/3 |

FOREIGN PATENT DOCUMENTS

| DE | 60111693 T2 | 5/2006 |
| DE | 102010026162 A1 | 1/2012 |
| EP | 1535836 A1 | 6/2005 |
| WO | 2012124594 A1 | 9/2012 |

OTHER PUBLICATIONS

The extended European search report; Application No. 14180948; Date of Mailing: Apr. 9, 2015; pp. 1-5.

* cited by examiner

*Primary Examiner* — Redhwan k Mawari
*Assistant Examiner* — Rodney P King
(74) *Attorney, Agent, or Firm* — Cantor Colburn LLP

(57) ABSTRACT

A method and apparatus for controlling an angular parameter between a base member and a control surface of an aircraft is disclosed. An estimate is obtained of an angular rate of the control surface with respect to an inertial frame of the aircraft using a rate sensor. A residual angular rate that is a difference between a commanded angular rate and the estimate of the angular rate of the control surface is determined. The residual angular rate is used to control the angular parameter of the control surface or the angular parameter of the base member.

12 Claims, 2 Drawing Sheets

FLUTTER CONTROL ACTUATOR

CROSS-REFERENCE TO RELATED APPLICATION

This application claims priority to U.S. Provisional Application Ser. No. 61/872,229, filed on Aug. 30, 2013, which is incorporated herein in its entirety by reference.

BACKGROUND

The present invention relates to controlling control surfaces on an aircraft and, more specifically, to controlling flutter at the control surfaces of the aircraft.

Flight control systems in today's aircraft utilize actuators, both electric and hydraulic, to move various control surfaces that affect the flow of air around the aircraft and thus control the maneuverability of the aircraft. Depending on flight conditions, air flow may create unwanted forces and motions on the surface to produce buffeting, fluttering, or other high-frequency vibrations. In order to counteract buffeting effects, large additional aircraft surfaces and structures, and consequently large actuators, are generally utilized. These requirements result in heavier aircraft, and correspondingly additional costly fuel consumption.

SUMMARY

According to one embodiment of the present invention, a method of controlling an angular parameter between a base member and a control surface of an aircraft includes: obtaining an estimate of an angular rate of the control surface with respect to an inertial frame using a rate sensor; determining a residual angular rate that is a difference between a commanded angular rate and the estimate of the angular rate of the control surface; and using the residual angular rate to control the base member to control the angular parameter of the control surface.

According to another embodiment of the present invention, an apparatus for controlling a vibration at a base member coupled to a control surface of an aircraft includes: a rate sensor configured to obtain an estimated angular rate of the control surface with respect to an inertial frame; a summing unit configured to generate a residual angular rate that is a difference between the estimated angular rate of the control surface with respect to the inertial frame and a commanded angular rate of the control surface; and a wave shaper that generates a signal for controlling the vibration at the base member using the residual angular rate generated by the summing unit.

According to another embodiment of the present invention, a method for controlling a vibration at a base member coupled to a control surface of an aircraft includes: obtaining, using a rate sensor, an estimate of an angular rate of the control surface with respect to an inertial frame; using a summing unit to generate a residual angular rate that is a difference between the estimate of the angular rate of the control surface with respect to the inertial frame and a commanded angular rate of the control surface; and using the generated residual angular rate to control the vibration at the base member.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
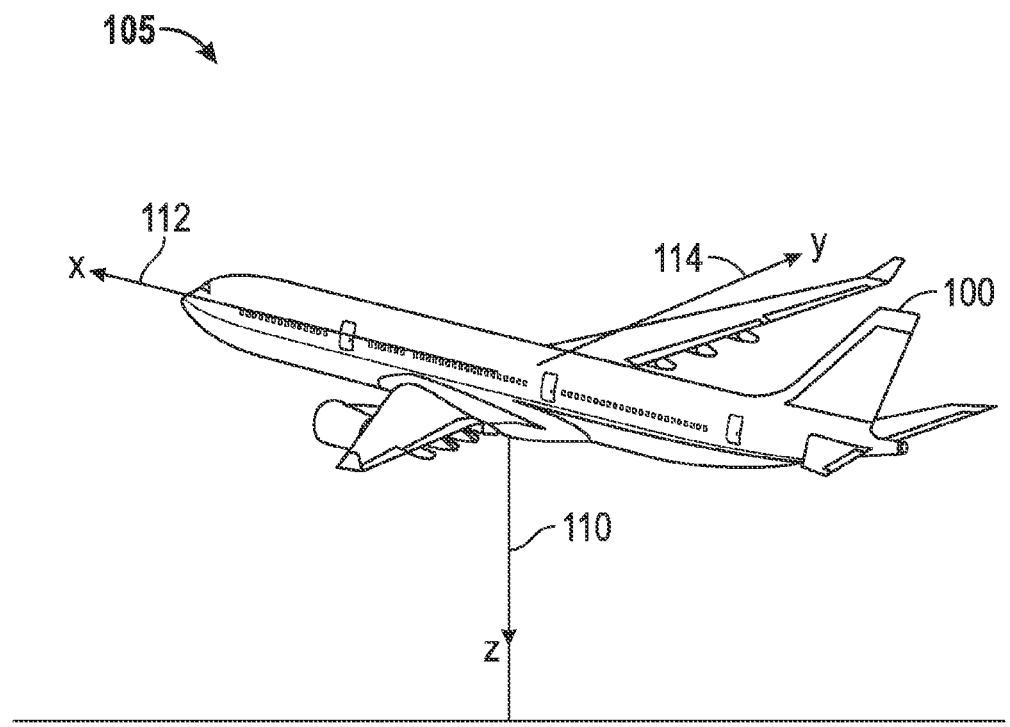
FIG. 1 shows an aircraft moving with respect to an inertial frame.

FIG. 1 shows an aircraft 100 oriented with respect to an inertial frame. The inertial frame is illustrated using a coordinate system 105 that includes a z-axis 110 that passes from the aircraft through the center of the earth. At least one of the x-axis 112 and y-axis 114 is selected to be oriented toward a fixed point in space, such as a celestial object. Various angular rates of the present invention are measured with respect to the coordinate system 105 of the inertial frame shown in FIG. 1.

Figure 2:
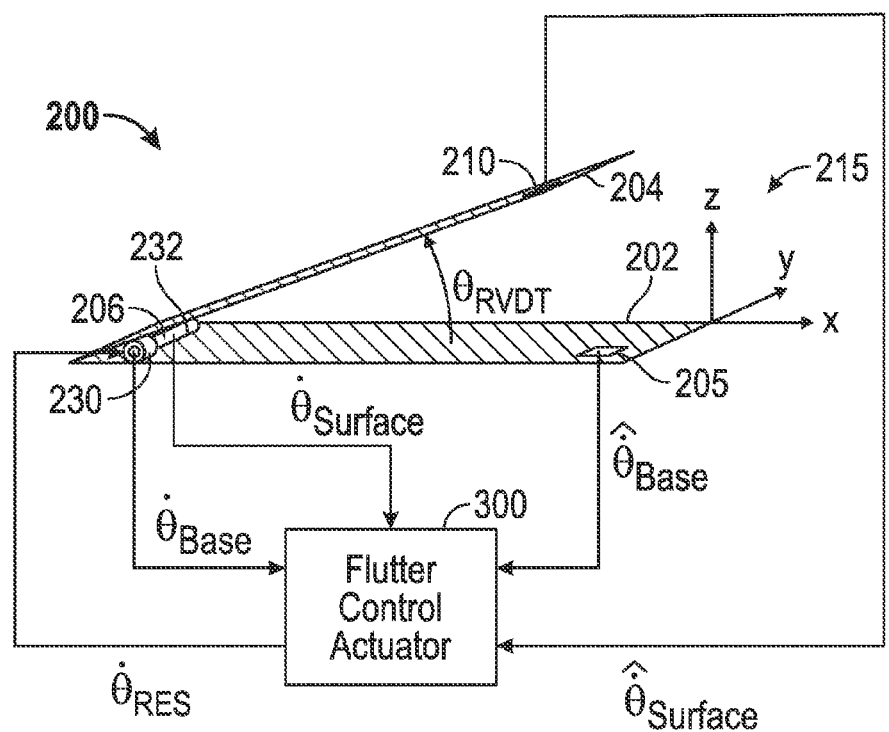
FIG. 2 shows an illustrative apparatus of the aircraft that controls a control surface of the aircraft.

FIG. 2 shows an illustrative apparatus 200 of the aircraft 100 that controls a control surface of the aircraft. The apparatus includes a base member 202 and a control surface 204 that moves relative to the base member 202. In various embodiments, the control surface 204 may include ailerons, flaps, elevators, rudders or other surfaces of the aircraft that are movable to maneuver the aircraft. An actuator 206 moves the control surface 204 relative to the base member 202 at an angular rate ($\dot{\theta}_{surface}$). The actuator 206 may include a housing 230 coupled or attached to the base member 202 and a gimbal or rod 232 that rotates with respect to the housing 230 when actuated by the housing 230. The rod 232 may be coupled or attached to the control surface 204. Rotation of the rod 232 within the housing 230 therefore produces an angular rotation of the control surface 204 with respect to the base member 202. An angle between the control surface 204 and the base member 202 is shown as angle $\theta_{RVDT}$. The angular rate ($\dot{\theta}_{surface}$) of the control surface 204 is measured with respect to the inertial frame 215 and may be provided by a sensor related to the rod 232. Additionally, the angular rate $\dot{\theta}_{surface}$ may be affected by buffetting, flutter and/or other high frequency aircraft phenomena. The actuator 206 may be activated to move the control surface 204 in a determined manner that counteracts or reduces flutter at the control surface 204. However, activating the actuator 206 also contributes to the motion of the base member 202. Additionally, flutter at the control surface 204 may contribute to vibrations at the base member 202. Therefore in one aspect, the present invention therefore provides a method and apparatus for providing a signal at the actuator 206 that controls vibrations at the base member 202 and is based in part on the measurements of flutter (i.e., angular measurement $\dot{\theta}_{surface}$) at the control surface 204.

The angular rate ($\dot{\theta}_{base}$) of the base member 202 is measured with respect to the inertial frame and may be provided by a sensor within housing 230. A first rate sensor 205 may be mounted to the base member 202 and may be used to obtain an estimated angular rotation rate ($\hat{\dot{\theta}}_{base}$) of the base member 202 with respect to the inertial frame of reference. A second rate sensor 210 may be mounted to the control surface 204 and may used to obtain an estimated angular rate of rotation ($\hat{\dot{\theta}}_{surface}$) of the control surface 204 with respect to the inertial frame of reference. These angular parameters ($\dot{\theta}_{base}$, $\dot{\theta}_{surface}$, $\hat{\theta}_{base}$, and $\hat{\theta}_{surface}$) may be sent to the flutter control actuator 300 which produces a signal to control flutter of the control surface 204 and/or to control vibrations of the base member 202.

Figure 3:
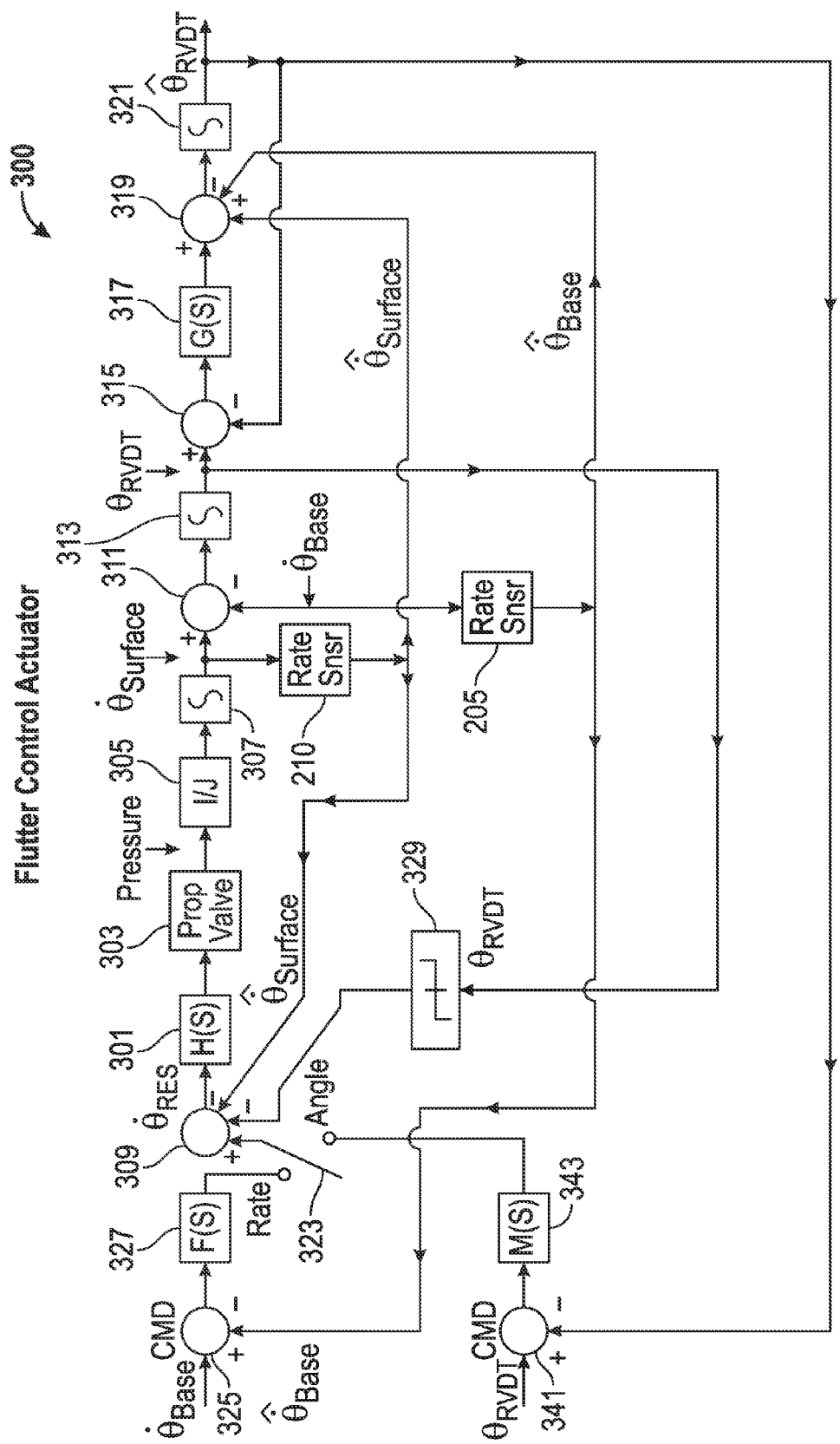
FIG. 3 shows an illustrative flutter control actuator in one embodiment of the present invention for controlling flutter and other high-frequency vibrations at a control surface of the aircraft.

FIG. 3 shows an illustrative flutter control actuator 300 in one embodiment of the present invention for controlling flutter and other high-frequency vibrations at the control surface 204 and/or at the base member 202. In one embodiment, the flutter control actuator 300 controls an angle ($\theta_{RVDT}$) of the control surface 204 of the aircraft as measured with respect to the base member 202. In another embodiment, the flutter control actuator 300 controls an angular rate $\dot{\theta}_{surface}$ of the control surface 204. A signal for controlling the angular rate $\dot{\theta}_{surface}$ is generally provided by a summing unit 309. The signal from the summing unit 309 is generally a residual angular rate $\dot{\theta}_{res}$. The residual angular rate $\dot{\theta}_{res}$ is the difference between a commanded angular rate and the angular rate $\dot{\theta}_{surface}$ of the control surface 204. In a first mode, the commanded angular rate may be based, in part, on an angular rate selected by an operator of the aircraft. In a second mode, the commanded angular rate may be based, in part, on an angle selected by the operator. The residual angular rate $\dot{\theta}_{res}$ is used to control a rate loop that controls angular rates $\dot{\theta}_{surface}$ of the control surface 204 to thereby control flutter at the control surface 204.

The residual angular rate of $\dot{\theta}_{res}$ is used as input to a wave shaper 301. The wave shaper 301 (as well as other wave shapers of the flutter control actuator 300) may be implemented as software, hardware or a combination of software and hardware. The wave shaper 301 outputs a signal having a selected shape corresponding to the residual angular rate $\dot{\theta}_{res}$ and provides the output signal to a proportioning valve 303. The signal may be a current signal or a voltage signal in various embodiments. The proportioning valve 303 receives the signal and produces a pressure in proportion to the input signal. The pressure is applied to the control surface 204 to create a torque on the control surface 204 which results in an angular acceleration of the control surface 204 which may be determined by calculator 305. The angular acceleration is determined by the torque and a moment of inertia of the control surface 204, wherein the moment of inertia is related to the mass and the configuration of the mass of the control surface 204. Integrator 307 integrates the angular acceleration to obtain an angular rate $\dot{\theta}_{surface}$ at the control surface 204. The angular rate $\dot{\theta}_{surface}$ is also measured by second rate sensor 210 to obtain an estimated angular rate $\hat{\dot{\theta}}_{surface}$ of the control surface 204 with respect to the inertial frame of reference. The measured angular rate $\hat{\dot{\theta}}_{surface}$ may be returned as input to the summing unit 309 in order to determine a new residual angular rate $\dot{\theta}_{res}$ that can be supplied to the wave shaper 301 to complete a first control loop.

While the second rate sensor 210 determines an estimated angular rate $\hat{\dot{\theta}}_{surface}$ of the control surface 204, the first rate sensor 205 determines an estimated angular rate $\hat{\dot{\theta}}_{base}$ of the base member 202. In another aspect of the actuator 300, angular rates $\dot{\theta}_{surface}$ and $\dot{\theta}_{base}$ are input to a summing unit 311. The "+" and "−" signs at the inputs to the summing unit 311 (as well as to the other summing units of the flutter control actuator 300) indicate a multiplicative coefficient of the input to the summing unit 311 and determines whether the inputs may be added or subtracted from one another. Thus, $\dot{\theta}_{surface}$ is multiplied by "+1" upon being input to the summing unit and $\dot{\theta}_{base}$ is multiplied by "−1" upon being input to the summing unit 311, and summing unit 311 outputs a difference of the angular rates (i.e., "$\dot{\theta}_{surface} - \dot{\theta}_{base}$"). The difference in the angular rates that is output from the summing unit 311 is sent to integrator 313 which determines angle $\theta_{RVDT}$, which is the angle between the control surface 204 and the base member 202.

Referring now to elements 315, 317, 319 and 321, these elements are used to obtain an estimated angle $\hat{\theta}_{RVDT}$ between the control surface 204 and the base member 202. In general, estimated angle $\hat{\theta}_{RVDT}$ does not include flutter or other high frequency phenomena. Summing unit 315 provides a difference between $\theta_{RVDT}$ and $\hat{\theta}_{RVDT}$ and the difference is sent to wave shaper 317 which generates a signal G(s). In various embodiments, the signal G(s) has the dimensions of an angular rate. Summing unit 319 receives signal G(s) and outputs an angular rate resulting from adding signal G(s) to a difference between angle estimates $\hat{\theta}_{surface}$ and $\hat{\theta}_{base}$. The output from the summing unit 319 is input to integrator 321. The integrator 321 integrates the input to determine an estimated angle $\hat{\theta}_{RVDT}$. In one aspect, the estimated angle $\hat{\theta}_{RVDT}$, which is an unbiased or time-averaged estimate of $\hat{\theta}_{RVDT}$, may be used as input to summing unit 315 to form a loop for obtaining subsequent values of $\hat{\theta}_{RVDT}$.

In one aspect, an operator may provide a command to the flutter control actuator 300. The provided command may be used to control an angular parameter (i.e., $\dot{\theta}_{surface}$ and/or $\theta_{RVDT}$) of the control surface 204. A switch 323 may be used to select a command signal to be input to the actuator 300 and more specifically to be input to the summing unit 309. In a first mode provided by a first position of the switch 323, the operator provides an angular rate command to the summing unit 309. In a second mode provided by a second position of the switch 323, the operator provides an angle command to the summing unit 309. In the first position, the switch 323 receives a signal F(s) from wave shaper 327. The signal F(s) is generated in response to output of summing unit 325. The output of the summing unit 325 is a difference between the operator-selected angular rate $\dot{\theta}_{base,command}$ and the estimated angular rate $\hat{\dot{\theta}}_{base}$ of the base member 202. In the second position the switch 323 receives a single M(s) that is generated at wave shaper 343 in response to output of summing unit 341. Summing unit 341 receives an operator-selected angle command $\theta_{RVDT,command}$ and the estimated angle $\hat{\theta}_{RVDT}$ and outputs their difference to the wave shaper 343. The signals F(s) and M(s) have dimensions of angular rate.

The summing unit 309 receives one of signals F(s) and M(s), the estimate of the angular rate of the surface $\hat{\dot{\theta}}_{surface}$ and a delimited angular rate related to estimated angle $\hat{\theta}_{RVDT}$, from limit switch 329. The limit switch 329 provides an extremum value, either a minimum angular rate or a maximum angular rate, that is based on the value of the estimated angle $\hat{\theta}_{RVDT}$. Therefore, when $\hat{\theta}_{RVDT}$ reaches a selected upper threshold value, the maximum angular rate is provided to the summing unit 309. When $\hat{\theta}_{RVDT}$ reaches a selected lower threshold value, the minimum angular rate is provided to the summing unit 309.

The summing unit 309 therefore outputs a residual angular rate $\dot{\theta}_{res}$ that is the commanded signal provided from switch 323 minus extremum value from the limit switch 329 and minus the angular rate $\dot{\theta}_{surface}$ of the control surface 204. The output $\dot{\theta}_{res}$ is used to control the first control loop using the methods discussed above, and is therefore used to control flutter at the control surface 204.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of controlling an angular parameter between a base member and a control surface of an aircraft, comprising:
    obtaining an estimate of an angular rate of the control surface with respect to an inertial frame using a rate sensor;
    determining, via a summing unit, a residual angular rate that is a difference between a commanded angular rate and the estimate of the angular rate of the control surface; and
    using the residual angular rate to control the base member to control the angular parameter of the control surface; and
    wherein determining the residual angular rate further comprises subtracting a set rate related to an extremum limit of the estimated angle between the control surface and the base member from the commanded angular rate of the control surface.

2. The method of claim 1, wherein the controlled angular parameter is one of: the angular rate of the control surface with respect to the inertial frame; and an angle between the base member and the control surface.

3. The method of claim 1, wherein the commanded angular rate is related to one of: an estimated angular rate of the base member; and an estimated angle between the control surface and the base member.

4. The method of claim 3, further comprising deriving a commanded angular rate of the base member by obtaining a difference between an operator-selected angular rate of the base member and the estimated angular rate of the base member.

5. The method of claim 3, further comprising deriving a commanded estimated angle between the control surface and the base member by obtaining a difference between an operator-selected angle between the control surface and the base member and the estimated angle between the control surface and the base member.

6. The method of claim 3, wherein the estimated angular rate of the base member is measured with respect to the inertial frame.

7. The method of claim 1, wherein controlling the angular parameter further comprises controlling flutter at the control surface.

8. An apparatus for controlling a vibration at a base member coupled to a control surface of an aircraft, comprising:
    a rate sensor configured to obtain an estimated angular rate of the control surface with respect to an inertial frame;
    a summing unit that receives the estimated angular rate of the control surface from the rate sensor and generates a residual angular rate that is a difference between the estimated angular rate of the control surface and a commanded angular rate of the control surface; and
    a wave shaper that receives the residual angular rate from the summing unit and generates a signal for controlling the vibration at the base member using the residual angular rate;
    wherein controlling the vibration further comprises controlling one of: an angular rate of the control surface with respect to the inertial frame; and an angle between the surface and the base member; and
    wherein the summing unit is further configured to generate the residual angular rate by subtracting an extremum of the estimate of the angle between the control surface and the base member from the commanded angular rate of the control surface.

9. The apparatus of claim 8, wherein the summing unit receives the commanded angular rate as a difference between an operator-selected angular rate of the base member and an estimated angular rate of the base member.

10. The apparatus of claim 9, wherein the estimated angular rate of the base member is measured with respect to the inertial frame.

11. The apparatus of claim 8, wherein the summing unit receives the commanded angular rate as a difference between an operator-selected angle between the control surface and the base member and the estimated angle between the control surface and the base member.

12. The apparatus of claim 8, wherein controlling the vibration at the base member further controls flutter at the control surface.

* * * * *